(12) United States Patent
Walker, III (10) Patent No.: US 7,845,886 B2
(45) Date of Patent: Dec. 7, 2010

(54) TIEDOWN SYSTEM

(76) Inventor: Clinton W. Walker, III, 1653 Cypress Ridge Dr., Greenville, MS (US) 38701

( * ) Notice: Subject to any disclaimer, the term of this patent is extended or adjusted under 35 U.S.C. 154(b) by 96 days.

(21) Appl. No.: 12/382,998

(22) Filed: Mar. 27, 2009

(65) Prior Publication Data
US 2010/0247264 A1 Sep. 30, 2010

(51) Int. Cl.
B60P 3/079 (2006.01)
B61D 45/00 (2006.01)
(52) U.S. Cl. .............. 410/2; 410/3; 410/4; 410/11; 410/96; 410/100
(58) Field of Classification Search .......... 410/2, 410/3, 4, 7, 8, 11, 12, 23, 96, 97, 100; 254/323, 254/338
See application file for complete search history.

(56) References Cited

U.S. PATENT DOCUMENTS

| | | | |
|---|---|---|---|
| 3,295,464 A * | 1/1967 | Broling | 410/12 |
| 3,595,598 A | 7/1971 | Nuzum | |
| 3,613,919 A | 10/1971 | Ceepo et al. | |
| 3,650,222 A | 3/1972 | Broling et al. | |
| 3,715,994 A | 2/1973 | Mietla | |
| 3,820,817 A * | 6/1974 | Harold | 410/23 |
| 4,022,134 A | 5/1977 | Krokos | |
| 4,049,229 A * | 9/1977 | Peisner | 410/11 |
| 4,147,113 A | 4/1979 | Kilgus et al. | |
| 4,243,243 A * | 1/1981 | Edmisten | 280/455.1 |
| 4,470,746 A | 9/1984 | Delachapelle | |
| 5,746,554 A * | 5/1998 | Boydstun et al. | 410/12 |
| 5,836,730 A * | 11/1998 | Boydstun et al. | 410/12 |
| 6,171,036 B1 | 1/2001 | Boydstun, IV et al. | |
| 6,524,040 B1 | 2/2003 | Heil | |
| 6,851,902 B2 | 2/2005 | Stanley | |
| 2004/0108685 A1 | 6/2004 | Pierce | |
| 2007/0074933 A1 | 4/2007 | Kerns | |
| 2008/0206010 A1* | 8/2008 | Fa-Kouri | 410/100 |

FOREIGN PATENT DOCUMENTS

DE 10333482 2/2005

OTHER PUBLICATIONS

Website, http://www.allprowest.com/3ATV Snowmobile.html, series of photos showing ATV trailers and ATV machines, seven pages printed from the internet on Oct. 13, 2008.

* cited by examiner

Primary Examiner—Patricia L Engle
(74) Attorney, Agent, or Firm—Richard C. Litman (57) ABSTRACT

The tiedown system has a single tensile member with cargo attachments on each end thereof. The tensile member passes through a series of guides affixed about the perimeter of the carrier (flatbed truck or trailer, etc.). The ends of the tensile member are secured removably to the rear of the cargo, e.g., the cargo rack of an all terrain vehicle (ATV). The medial portion of the tensile member is connected to a winch on the front of the ATV or other cargo, or alternatively the medial portion of the tensile member is passed through an opening on the front of the cargo, e.g., the forward cargo rack of the ATV, and connected to a winch anchored to the cargo bed of the carrier. The winch is actuated to draw up the tensile member, simultaneously pulling the rear and front of the cargo securely against the cargo bed of the carrier.

14 Claims, 6 Drawing Sheets

TIEDOWN SYSTEM

BACKGROUND OF THE INVENTION

1. Field of the Invention

The present invention relates generally to systems developed for securing heavy objects for transport, and particularly to a tiedown system using a single tensile member (cable, etc.) to secure an object, particularly an all-terrain vehicle (ATV) or similar load, at its forward and rearward ends atop a truck bed, trailer, or the like.

2. Description of the Related Art

The necessity of securing cargo immovably upon or in a carrier (ship, truck, wagon, etc.) has been known for ages. As a result, innumerable systems have been developed in the past for loading and securing articles in or upon a vehicle for carriage and transport. These earlier tiedown systems generally include a relatively large number of ropes, cables, chains, or other tensile members secured to a like number of anchor points on the cargo and on the carrier. A separate but related class of devices comprises various systems for moving a large and/or heavy object onto or into a carrier, i.e., winches and the like.

An example of such devices and systems is found in German Patent Publication No. 10,333,482, published on Feb. 10, 2002. This reference describes (according to the drawings and English abstract) a flatbed truck having an extending front suspension for lowering the rear of the truck to facilitate loading a trailer thereon. The trailer is pulled onto the flatbed by a winch located at the front of the flatbed, and secured to the flatbed by a series of wheel chocks and lateral straps.

None of the above inventions and patents, taken either singly or in combination, is seen to describe the instant invention as claimed. Thus, a tiedown system solving the aforementioned problems is desired.

SUMMARY OF THE INVENTION

The tiedown system comprises a single tensile member or line (e.g., cable, rope, etc.) having a hook or other attachment means at each of the two ends thereof. The tensile member or line extends through a series of guides (eyebolts, pulleys, etc.) affixed about the perimeter of the cargo bed of the carrier. The two ends of the line extend from the rearwardly disposed guides. Each end of the line is removably secured to the rear of the cargo and drawn taut by a winch attached to the front of the cargo, e.g., an all terrain vehicle (ATV) or the like. The winch is connected to the medial portion of the line at the front of the cargo bed and then retracted to tighten the tensile member or line, with the tension on the ends of the line drawing the rear of the cargo securely down upon the cargo bed and the tension on the medial portion of the line drawing the forward end of the cargo securely down upon the cargo bed.

An alternative embodiment is provided for cargo not having a self-contained winch. In such a case, a winch is installed upon the forward end of the cargo bed. The cargo is placed upon the bed with the ends of the line removably connected (hooked, etc.) to the rear of the cargo. The medial portion of the tensile member or line is looped through a passage or opening on the front of the cargo, e.g., through the cargo rack, open bumper, or tiedown loops conventionally provided on ATVs. The winch is then connected to the loop of the tensile member extending from the forward end of the cargo and drawn taut, thereby tightening the tensile member to draw the both the rearward end and the forward end of the cargo securely against the underlying cargo bed.

The tiedown system is particularly well suited for securing a small all terrain vehicle (ATV) atop a cargo bed, e.g., trailer, pickup truck bed, or the bed of a flatbed truck or the like. However, the tiedown system is also well suited for use in securing other large and heavy objects to the bed of a carrier or other platform, as desired.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a tiedown system for temporarily and/or removably securing a cargo object to the bed of a transport vehicle. The system is particularly well suited for securing an all terrain vehicle (ATV) or the like to the cargo bed of a trailer adapted for carrying such an ATV, or alternatively to the cargo bed of a flatbed truck or pickup truck.

Figure 1:
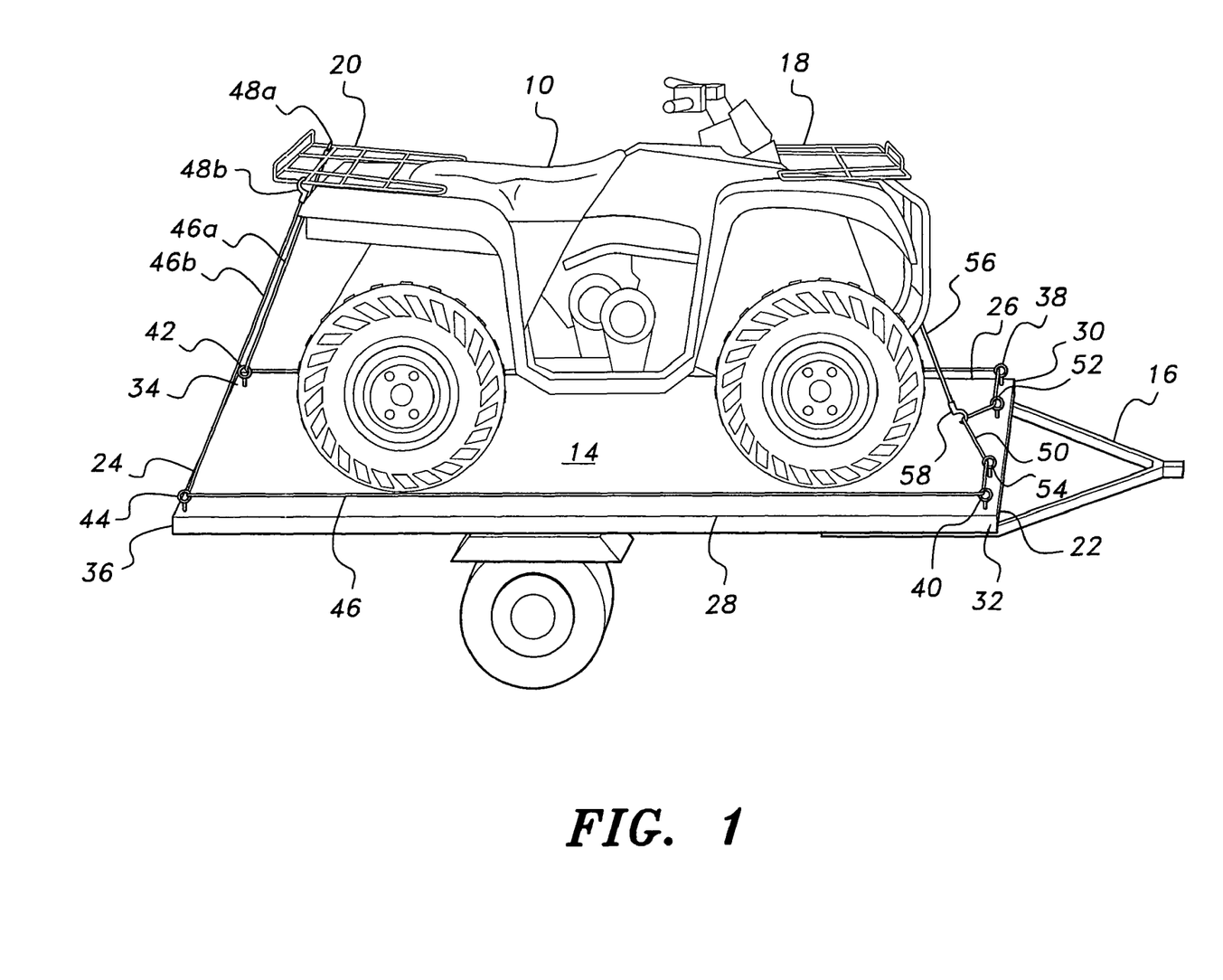
FIG. 1 is an environmental, perspective view of a tiedown system according to the present invention, showing an all-terrain vehicle (ATV) secured upon a trailer, the ATV winch being used to tighten the tiedown system.

FIG. 1 provides a right side perspective view of a first embodiment of the tiedown system, in which the system is used to secure an ATV 10 having a conventional integral electric winch 12 (partially visible in FIG. 2) to the cargo bed 14 of a trailer 16. The ATV further includes forward and rear tiedown attachments comprising cargo racks, respectively 18 and 20, which are conventional open grate racks generally installed on ATVs.

The trailer cargo bed 14 includes a forward end 22, an opposite rearward end 24, and mutually opposite left and right sides 26 and 28, with the ends and sides 22 through 28 defining a left front corner 30, right front corner 32, left rear corner 34, and right rear corner 36. Each of the corners 30 through 36 has a corner tiedown guide, respectively 38 through 44, affixed into the bed 14 and extending therefrom, adjacent to the respective corner. In the exemplary embodiment of FIG. 1, the guides 38 through 44 comprise a series of eyebolts, although other guide means may be used as desired, e.g., the pulleys shown in FIGS. 2 and 4, or hooks set with their bights disposed outwardly, etc.

A single tensile member or line 46 passes through each of the guides 38 through 44, with the line 46 having its opposite left and right end portions 46a and 46b extending from the respective left and right guides 42 and 44. The line or tensile member 46 may comprise a steel cable, wire rope, rope formed of natural or synthetic materials, or any other flexible tensile material as practicable. The two end portions 46a, 46b terminate in hooks 48a and 48b, which may be removably secured to the rear cargo rack 20 of the ATV 10. Alternative cargo attachment means may be used in lieu of the hooks 48a, 48b as desired, e.g., snap hooks, clips, karabiners, or in the case of a flexible rope being used for the tensile member or line 46, the ends 46a, 46b may be tied to the cargo rack 20 or other convenient and secure component of the ATV.

The line or tensile member 46 extends forwardly from the rear corner guides 42 and 44 to pass through the two forward corner guides 38 and 40 to the medial portion 50 of the line. Additional forward guides 52 and 54 are preferably affixed to the cargo bed 14 adjacent the forward edge 22 thereof, between the two front corner guides 38 and 40. The forward guides 52, 54 reduce the length of the tensile member medial portion 50 drawn up to tighten the tensile member or line 46, thereby reducing the amount of winch cable that must be retracted to tighten the line and enabling the ATV 10 to be positioned closer to the forward end 22 of the trailer 16.

The tiedown system is used by initially placing the cargo (e.g., ATV 10, or other cargo having suitable means for attaching the tensile member thereto) upon the cargo bed 14. The two ends 46a, 46b of the line 46 are connected to the rear cargo rack 20 (or other attachment means) with the hooks 48a, 48b (or other means). The winch 12 (shown partially in FIG. 2) is operated to extend the winch cable 56 therefrom, and the winch cable hook 58 is hooked around the medial portion 50 of the tensile line 46. The winch 12 is then reversed to retract the winch cable 56 thereon, thus drawing the medial portion 50 of the tensile line or member 46 from its alignment through the guides 38, 40, 52, and 54. This draws the remainder of the line 46 forward through the corner guides 38 through 44, thus pulling the two end portions 46a, 46b downwardly to tighten their hold on the rear rack 20 of the ATV. The system functions optimally when used to secure a wheeled vehicle to the cargo bed, as the brakes may be left off to allow the vehicle to roll slightly forward or back to equalize the tiedown tension at the front and back of the vehicle. However, it will be seen that the present tiedown system is not limited to use with wheeled vehicles.

Figure 2:
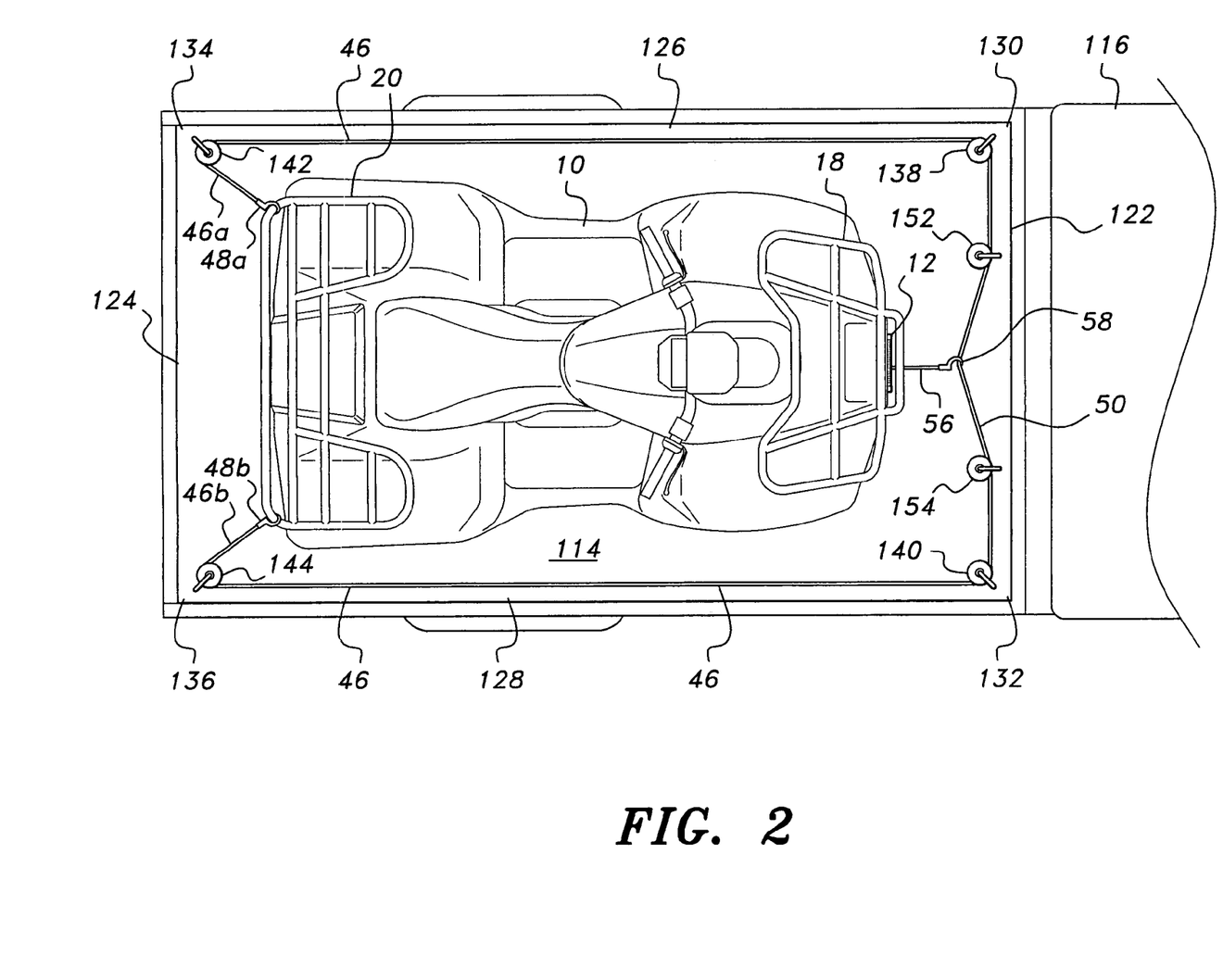
FIG. 2 is an environmental top plan view of the tiedown system of FIG. 1.

FIG. 2 of the drawings illustrates a top plan view of a second embodiment of the tiedown system, wherein the system is installed in the bed of a pickup truck. Identical components to those in FIG. 1 are referred to using the same reference numerals, with corresponding components using three digit reference numerals with the second and third digits identical to those of the corresponding components in FIG. 1. In FIG. 2, the ATV 10 is shown resting upon the cargo bed or floor 114 of a pickup truck 116, with the cargo bed 114 having a forward end 122 defined by the forward wall or cab of the pickup truck, an opposite rearward end 124 defined by the tailgate of the truck, and opposite left and right sides 126 and 128 defined by the left and right side walls of the pickup truck box. The ends and sides 122 through 128 define the left front corner 130, right front corner 132, left rear corner 124, and right rear corner 136 of the bed or floor 114. Each of the corners includes a tensile member corner guide affixed adjacent thereto, with the corner guides 138 through 144 of FIG. 2 comprising pulleys, rather than eyebolts. The use of pulleys reduces friction in the system somewhat, although this is generally not critical.

A single tensile member or line 46 passes through each of the guides 138 through 144 with the two end portions 46a, 46b extending from the two rear guides 142 and 144, similar to the embodiment of FIG. 1, using eye bolts. The two ends of the tensile member or line are equipped with hooks 48a, 48b for securing to the rear cargo rack 20 of the ATV 10, or other convenient attachment point(s) of the cargo being secured. The cable 56 extending from the winch 12 of the ATV 10 is extended to hook onto the medial portion 50 of the line 46, and the winch cable 56 is retracted to draw up the medial portion 50 of the tensile line 46 and, thus, apply tension to the end portions 46a, 46b of the line 46 to draw down the rear cargo rack 20 of the ATV and secure the ATV to the bed or floor 114. As in the case of the first embodiment illustrated in FIG. 1 and discussed further above, additional left front and right front guide pulleys 152 and 154 may be installed to reduce the span of the line 46 that must be drawn upwardly and rearwardly by the winch 12 to tighten the line.

Figure 3:
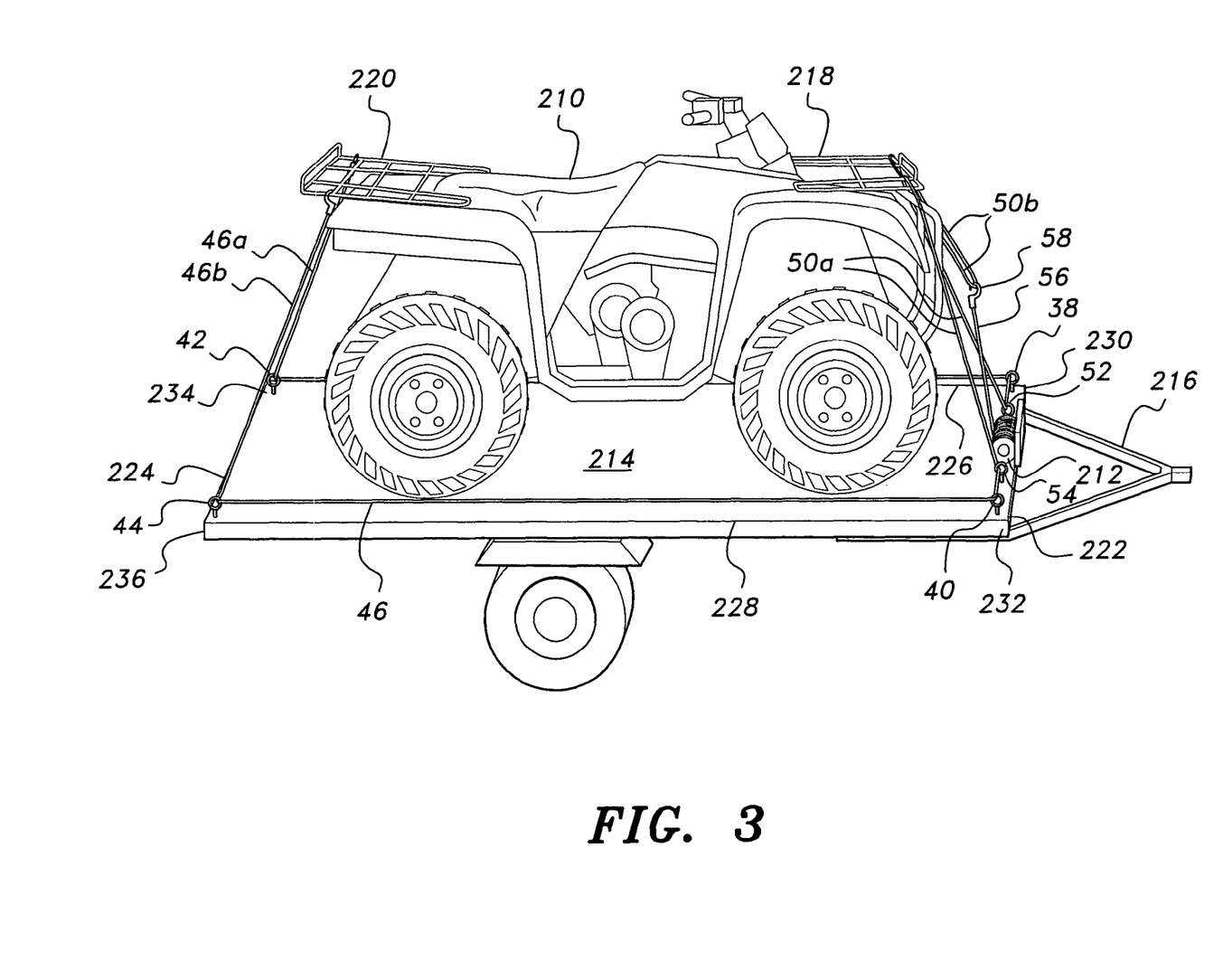
FIG. 3 is an environmental, perspective view of a tiedown system according to the present invention, showing an all-terrain vehicle (ATV) secured upon a trailer, the tiedown system being secured by a winch disposed upon the trailer.

FIG. 3 of the drawings illustrates an embodiment wherein the ATV 210 is not equipped with a winch. In this embodiment, the trailer 216 includes a manually actuated winch 212 installed at the forward end 222 of the cargo bed 214. The cargo bed is defined by its forward end 222, opposite rearward end 224, and two opposed sides 226 and 228, which in turn define the left front corner 230, right front corner 232, left rear corner 234, and right rear corner 236. The cargo bed 214 differs from the cargo bed 14 only in that it includes the manually actuated winch 212 thereon, with the ATV 210 differing from the ATV 10 only in that it does not include a winch.

The tensile member or line 46 of FIG. 3 extends through a series of corner tiedown guides 38 through 44, identical to the eyebolts 38 through 44 of the embodiment of FIG. 1. The two ends 46a, 46b of the tensile member 46 are secured to the rear cargo rack 220 of the ATV 210, and the medial portion of the tensile member is drawn taut by the winch 212 on the forward end of the cargo bed 214 of the trailer 216. It will be seen that the tensile member 46 must be secured to the forward end of the ATV in some manner, for the tensile line or member 46 to exert a balanced tiedown force on both ends of the ATV. This is accomplished by extending the medial portion of the tensile member upwardly from the two forward tiedown guides 52 and 54 and through the forward cargo rack 218 of the ATV, as indicated by the first central portions 50a of the tensile member, and then back down to the winch cable 56 and its hook 58, as shown by the uppermost loop portion 50b of the tensile member. The tensile member or line 46 may be extended to provide the additional length required to wrap through the forward cargo rack 218 of the ATV 210, e.g., by providing a longer line 46, or connecting an extension line (not shown) to the line 46, as required.

Thus, the manual winch 212 can be cranked to retract its cable 56, drawing the uppermost and medial loop portion 50b of the line 46 downwardly toward the winch 212 while drawing the first central portions 50a of the line 46 upwardly. This tightens the remainder of the line 46, drawing the ends 46a, 46b of the line downwardly to secure the rearward end of the ATV simultaneously as the forward end of the ATV is secured by the downward pull of the winch cable 56 and uppermost loop portion 50b of the tensile line 46.

Figure 4:
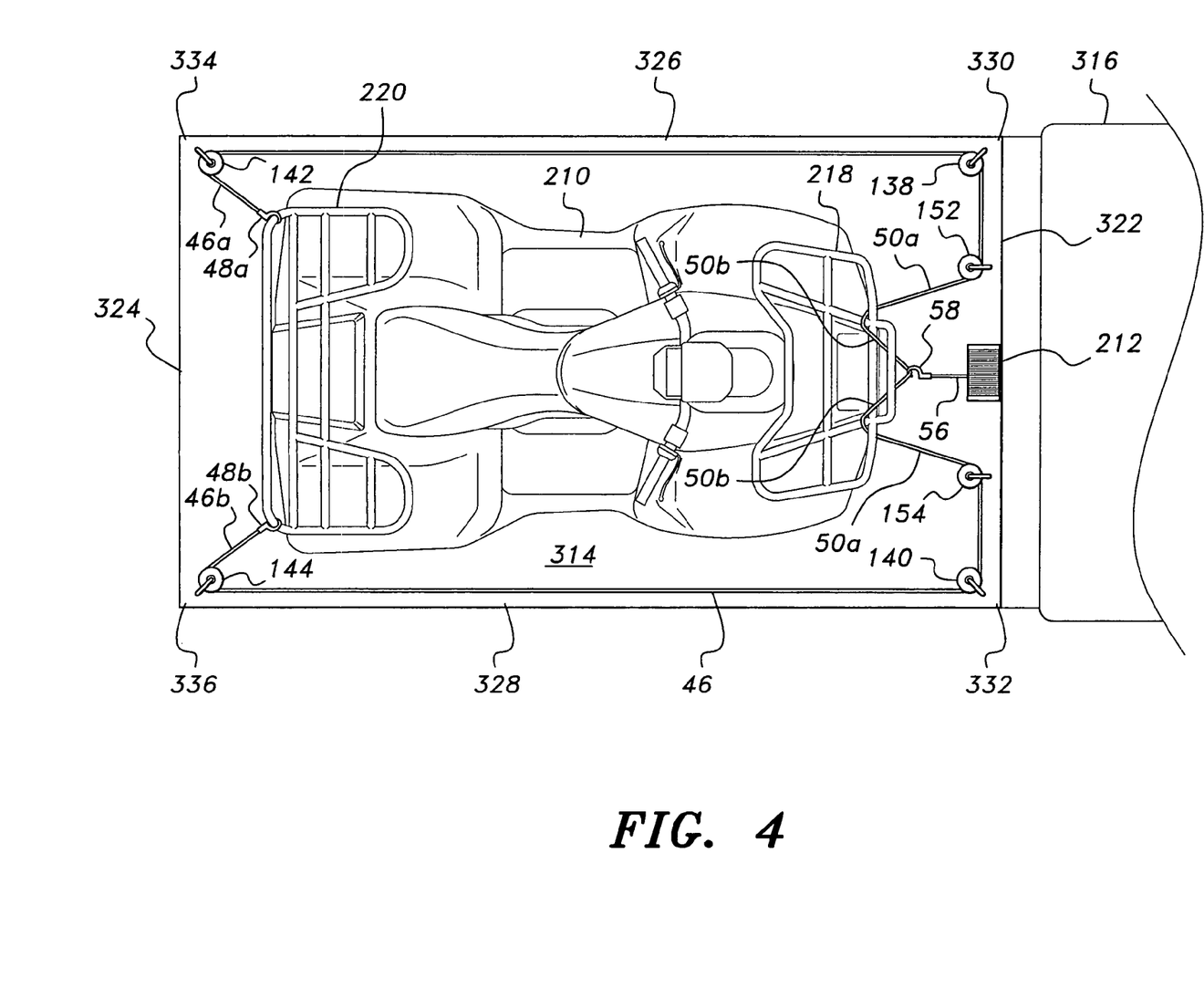
FIG. 4 is an environmental top plan view of the tiedown system of FIG. 3.

FIG. 4 of the drawings illustrates yet another embodiment wherein the tiedown system is installed upon the cargo bed of a flatbed truck. The tiedown system of FIG. 4 is in effect a combination of those of FIGS. 1 and 3, with the manual winch 212 being installed at the front end 322 of the cargo bed 314 of the flatbed truck 316. The winch may comprise an electrically operated winch with power provided by the electrical system of the truck, if so desired. The ATV 210 is similar to the ATV 210 of FIG. 3, in that it is not equipped with an operable winch.

The tensile member or line 46 of FIG. 4 extends through a series of corner tiedown guides 138 through 144, identical to the pulleys 138 through 144 of the embodiment of FIG. 2. The two ends 46a, 46b of the tensile member 46 are secured to the rear cargo rack 220 of the ATV 210, and the medial portion of the tensile member is drawn taut by the winch 212 on the forward end of the cargo bed 314 of the flatbed truck 316. The forward end of the ATV 210 is secured to the cargo bed 314 by essentially the same means as illustrated in FIG. 4 and discussed further above, i.e., by extending the medial portion of the tensile member upwardly from the two forward tiedown guide pulleys 152 and 154 and through the forward cargo rack 218 of the ATV, as indicated by the first central portions 50a of the tensile member, and then back down to the winch cable 56 and its hook 58, as shown by the uppermost loop portion 50b of the tensile member. As in the case of the embodiment illustrated in FIG. 3 and discussed further above, the tensile member or line 46 may be extended to provide the additional length required to wrap through the forward cargo rack 218 of the ATV 210, e.g., by providing a longer line 46, or connecting an extension line (not shown) to the line 46, as required.

Thus, the manual winch 212 can be cranked to retract its cable 56, drawing the uppermost and medial loop portion 50b of the line 46 downwardly toward the winch 212 while drawing the first central portions 50a of the line 46 upwardly. This tightens the remainder of the line 46, drawing the ends 46a, 46b of the line downwardly to secure the rearward end of the ATV simultaneously as the forward end of the ATV is secured by the downward pull of the winch cable 56 and uppermost loop portion 50b of the tensile line 46.

Figure 5:
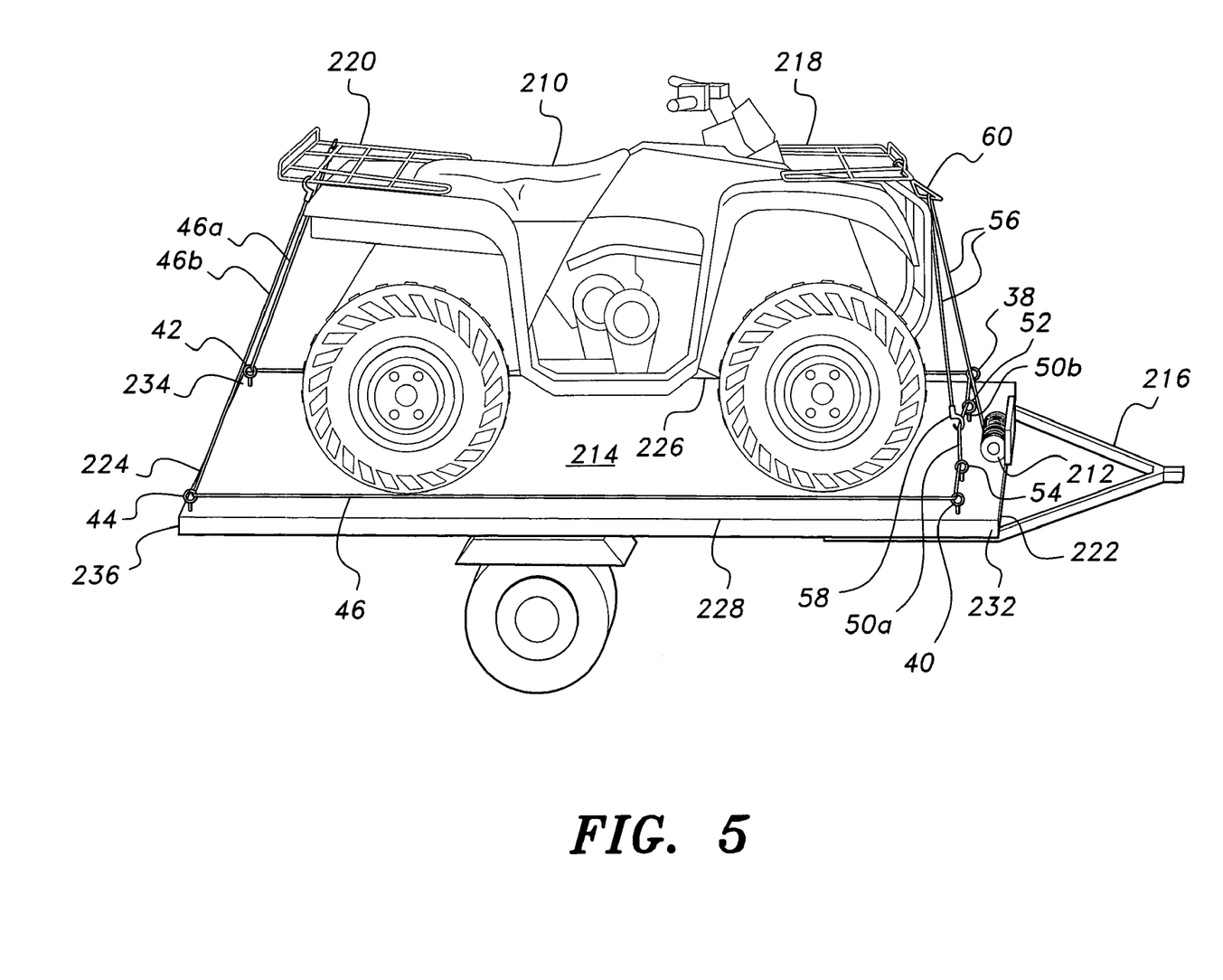
FIG. 5 is an environmental perspective view of an alternative embodiment of a tiedown system according to the present invention, showing an alternative path for the tensile member and winch line.

FIG. 5 of the drawings illustrates an embodiment of a tiedown system similar to that of FIG. 3, wherein the ATV 210 is not equipped with a winch. In this embodiment, the trailer 216 includes a manually actuated winch 212 installed at the forward end 222 of the cargo bed 214. The cargo bed is defined by its forward end 222, opposite rearward end 224, and two opposed sides 226 and 228, which in turn define the left front corner 230, right front corner 232, left rear corner 234, and right rear corner 236. The cargo bed 214 differs from the cargo bed 14 only in that it includes the manually actuated winch 212 thereon, with the ATV 210 differing from the ATV 10 only in that it does not include a winch.

The tensile member or line 46 of FIG. 5 extends through a series of corner tiedown guides 38 through 44, identical to the eyebolts 38 through 44 of the embodiments of FIGS. 1 and 3. The two ends 46a, 46b of the tensile member 46 are secured to the rear cargo rack 220 of the ATV 210, and the medial portion 50a, 50b of the tensile member is drawn taut by the winch 212 on the forward end of the cargo bed 214 of the trailer 216. However, rather than extending the medial portion 50a, 50b of the tensile member 46 through the forward cargo rack 218 of the ATV 210, as shown in FIG. 3, the winch cable 56 is extended from its winch 212 to pass through a medial winch cable hook 60, which is free to slide adjustably along the length of the winch cable 56 as required. The distal end of the winch cable 56 with its hook 58 is extended back down to attach to the medial portion 50a, 50b of the tensile member 46. Alternatively, the medial winch cable hook 60 may be deleted and the winch cable 56 passed directly through or around some portion of the forward cargo rack 218 or other structure, and back down to connect to the medial portion of the tensile member.

Thus, the manual winch 212 can be cranked to retract its cable 56 through the adjustably positionable winch cable hook 60, drawing the hook 58 of the winch cable 56 upwardly to pull the medial portions 50a, 50b of the tensile member 46 upwardly. This tightens the remainder of the line 46, drawing the ends 46a, 46b of the line downwardly to secure the rearward end of the ATV simultaneously as the forward end of the ATV is secured by the upward pull of the winch cable hook 58 and medial portions 50a, 50b of the tensile line 46.

Figure 6:
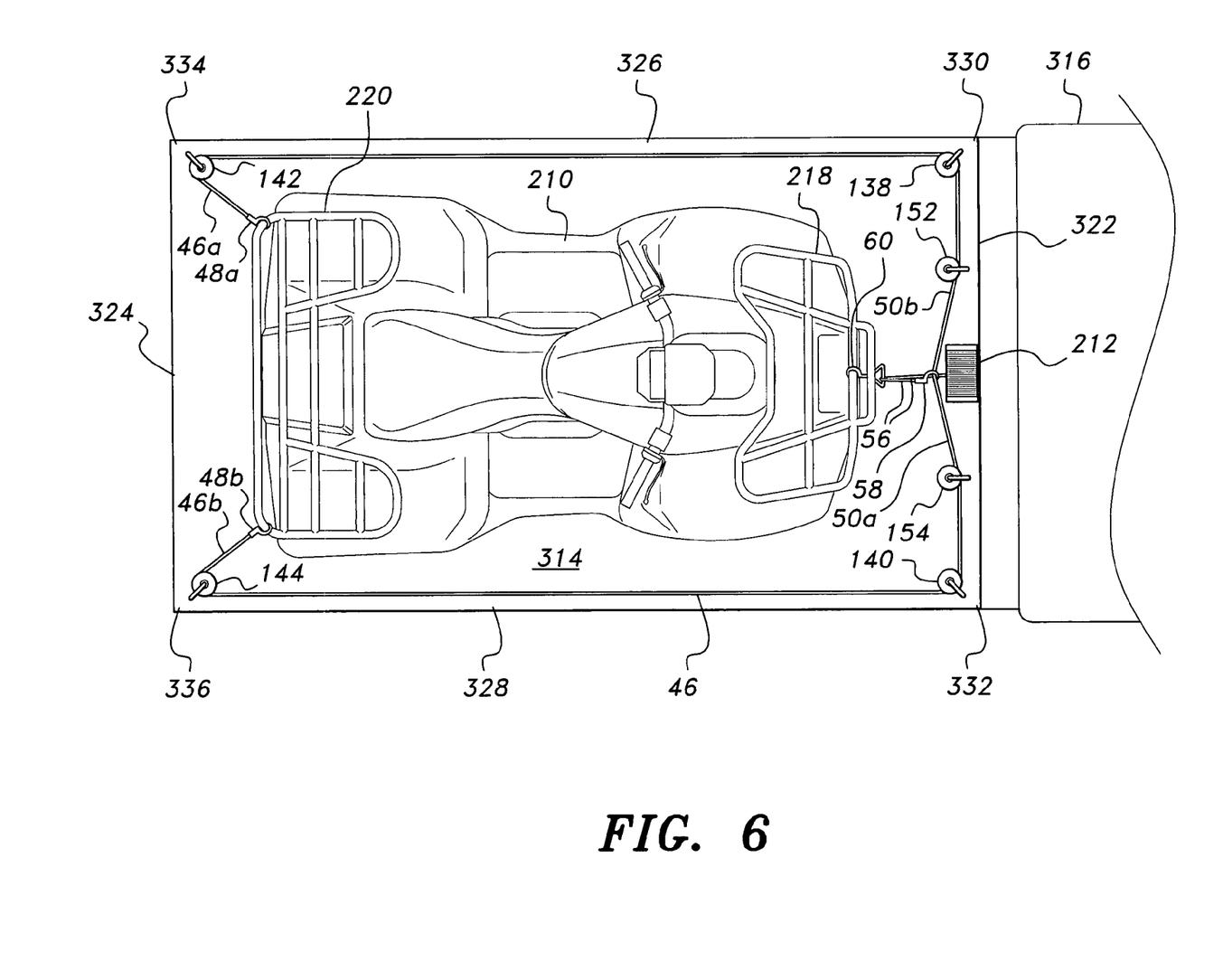
FIG. 6 is an environmental top plan view of another embodiment of a tiedown system according to the present invention.

FIG. 6 of the drawings illustrates yet another embodiment of a tiedown system that is installed upon the cargo bed of a flatbed truck. The tiedown system of FIG. 6 is in effect a combination of those of FIGS. 1 and 5, with the manual winch 212 being installed at the front end 322 of the cargo bed 314 of the flatbed truck 316. The winch may comprise an electrically operated winch with power provided by the electrical system of the truck, if so desired. The ATV 210 is similar to the ATV 210 of FIGS. 3 and 5, in that it is not equipped with an operable winch.

The tensile member or line 46 of FIG. 6 extends through a series of corner tiedown guides 138 through 144, identical to the pulleys 138 through 144 of the embodiments of FIGS. 2 and 4. The two ends 46a, 46b of the tensile member 46 are secured to the rear cargo rack 220 of the ATV 210, and the medial portion 50a, 50b of the tensile member is drawn taut by the winch 212 on the forward end of the cargo bed 314 of the flatbed truck 316. The forward end of the ATV 210 is secured to the cargo bed 314 by essentially the same means as illustrated in FIG. 5 and discussed further above, i.e., by extending the winch cable 56 from its winch 212 to pass through a medial winch cable hook 60, which is free to slide adjustably along the length of the winch cable 56 as required. The distal end of the winch cable 56 with its hook 58 is extended back down to attach to the medial portion 50a, 50b of the tensile member 46. Alternatively, the medial winch cable hook 60 may be deleted as noted in the discussion of the embodiment of FIG. 5 and the winch cable 56 passed directly through or around some portion of the forward cargo rack 218 or other structure, and back down to connect to the medial portion of the tensile member.

Thus, the manual winch 212 can be cranked to retract its cable 56 through the adjustably positionable winch cable hook 60, drawing the hook 58 of the winch cable 56 upwardly to pull the medial portions 50a, 50b of the tensile member 46 upwardly. This tightens the remainder of the line 46, drawing the ends 46a, 46b of the line downwardly to secure the rearward end of the ATV simultaneously as the forward end of the ATV is secured by the upward pull of the winch cable hook 58 and medial portions 50a, 50b of the tensile line 46.

It is to be understood that the present invention is not limited to the embodiments described above, but encompasses any and all embodiments within the scope of the following claims.

I claim:

1. A tiedown system, comprising:

a cargo bed having a forward end, a rearward end opposite the forward end, and mutually opposite left and right sides, the ends and sides defining left front, right front, left rear, and right rear corners;

a plurality of corner guides affixed to the cargo bed adjacent the left front, right front, left rear, and right rear corners thereof;

a single tensile member extending through the guides and along the left and right sides and forward end of the cargo bed, the tensile member having a medial portion disposed along the forward end of the cargo bed and mutually opposed first and second ends extending respectively from the guides at the left rear and right rear of the cargo bed, the first and second ends of the tensile member having cargo attachment members; and a winch having a winch cable selectively connecting the medial portion of the tensile member to cargo disposed upon the cargo bed, the winch cable being selectively retracted to tighten the tensile member and simultaneously secure the forward and rearward ends of the cargo to the cargo bed.

2. The tiedown system according to claim 1, wherein the winch is affixed to the forward end of the cargo bed.

3. The tiedown system according to claim 1, further comprising a pair of forward guides affixed to the cargo bed adjacent the forward end and between the corner guides of the left front and right front corners thereof.

4. The tiedown system according to claim 1, further comprising a medial winch cable hook adjustably disposed along the winch cable.

5. The tiedown system according to claim 1, wherein the guides are selected from the group consisting of eyebolts and pulleys.

6. The tiedown system according to claim 1, wherein the tensile member is selected from the group consisting of steel cable, wire rope, and rope.

7. The tiedown system according to claim 1, wherein the winch is selected from the group consisting of electrically powered winches and manually powered winches.

8. A tiedown system, comprising:
   a cargo bed having a forward end, a rearward end opposite the forward end, and mutually opposite left and right sides, the ends and sides defining left front, right front, left rear, and right rear corners;
   a plurality of corner guides affixed to the cargo bed adjacent the left front, right front, left rear, and right rear corners thereof;
   a single tensile member extending through the guides and along the left and right sides and forward end of the cargo bed, the tensile member having a medial portion disposed along the forward end of the cargo bed and mutually opposed first and second ends extending respectively from the guides at the left rear and right rear of the cargo bed, the first and second ends of the tensile member having cargo attachment members; and
   a vehicle removably disposed upon the cargo bed, the vehicle having a rearward end having at least one tiedown attachment disposed thereon and a forward end having at least one tiedown attachment and a winch with a winch cable disposed thereon, the winch cable selectively connecting the medial portion of the tensile member to the vehicle, the winch cable being selectively retracted to tighten the tensile member and simultaneously secure the forward and rearward ends of the vehicle to the cargo bed.

9. The tiedown system according to claim 8, wherein the vehicle is an all terrain vehicle.

10. The tiedown system according to claim 8, further comprising a pair of forward guides affixed to the cargo bed adjacent the forward end between the corner guides of the left front and right front corners.

11. The tiedown system according to claim 8, further comprising a medial winch cable hook adjustably disposed along the winch cable.

12. The tiedown system according to claim 8, wherein the guides are selected from the group consisting of eyebolts and pulleys.

13. The tiedown system according to claim 8, wherein the tensile member is selected from the group consisting of steel cable, wire rope, and rope.

14. The tiedown system according to claim 8, wherein the winch is selected from the group consisting of electrically powered winches and manually powered winches.

\* \* \* \* \*